United States Patent [19]

Kroplinski et al.

[11] 4,170,559

[45] Oct. 9, 1979

[54] HOLLOW FIBER SEPARATORY DEVICE

[75] Inventors: Thaddeus F. Kroplinski, Bound Brook; Barton C. Case, Howell, both of N.J.

[73] Assignee: N L Industries, Inc., New York, N.Y.

[21] Appl. No.: 783,086

[22] Filed: Mar. 31, 1977

Related U.S. Application Data

[62] Division of Ser. No. 739,380, Nov. 5, 1976, abandoned.

[51] Int. Cl.² .............................................. B01D 31/00
[52] U.S. Cl. ................................. 210/321 A; 55/158; 210/321 B; 422/48
[58] Field of Search ........... 210/321 A, 321 B, 321 C, 210/22, 500 M; 260/18; 23/258.5; 55/16, 158; 165/158; 422/48

[56] References Cited

U.S. PATENT DOCUMENTS

| | | | |
|---|---|---|---|
| 3,274,134 | 9/1966 | Ramos | 260/18 |
| 3,345,311 | 10/1967 | Ehrlich et al. | 260/18 |
| 3,362,921 | 1/1968 | Ehrlich et al. | 260/18 |
| 3,483,150 | 12/1969 | Ehrlich et al. | 260/18 |
| 3,708,071 | 1/1973 | Crowley | 210/321 B |
| 3,962,094 | 6/1976 | Davis et al. | 210/321 A X |

*Primary Examiner*—Frank A. Spear, Jr.
*Attorney, Agent, or Firm*—Gary M. Nath; Claude L. Beaudoin; Robert L. Holiday

[57] ABSTRACT

A hollow fiber separatory device is provided wherein a polyurethane prepolymer is cross-linked or cured with an ester of a polyhydric alcohol which contains two or three hydroxyl groups, e.g., propylene glycol monoricinoleate, and an aliphatic acid of at least 12 carbon atoms and one or more epoxy and/or hydroxy groups per molecule.

9 Claims, No Drawings

HOLLOW FIBER SEPARATORY DEVICE

This application is a division of application Ser. No. 739,380 filed Nov. 5, 1976, now abandoned.

FIELD OF INVENTION

The present invention relates to polymeric compositions designated as polyurethanes and, more particularly, relates to such polyurethanes derived from a prepolymer of a multifunctional agent such as castor oil and an organic diisocyanate which is cured with a cross-linking agent comprising the ester of a polyhydric alcohol having two or three hydroxyl groups and an aliphatic acid of at least 12 carbon atoms and one or more epoxy and/or hydroxy groups per molecule.

BACKGROUND OF INVENTION

Polyurethane compositions obtained by reacting a suitable prepolymer of an organic diisocyanate and a curing agent such as a polyalkylene glycol are generally well-known. Ordinarily, the organic diisocyanate is reacted with a suitable polyfunctional compound that contains active hydrogen groups to provide a prepolymer composition. The prepolymer is thereafter reacted with a suitable curing or cross-linking agent to provide the polyurethane composition. For instance, U.S. Pat. No. 3,362,921 discloses an elastomeric polyurethane derived from a prepolymer obtained by reacting castor oil and organic diisocyanate such as toluene diisocyanate. The resulting prepolymer is cross-linked by reaction with a suitable ester of a polyhydric alcohol which contains at least four hydroxy groups, e.g., pentaerythritol monoricinoleate. U.S. Pat. No. 3,362,921 discloses that it is essential to utilize a cross-linking or curing agent derived from esters of polyhydric alcohols that contain at least four hydroxy groups in order to obtain a cured polyurethane having desirable elastomeric properties for potting applications.

THE INVENTION

According to the present invention, there is provided a polyurethane composition obtained by reacting a diisocyanate prepolymer with an ester of a polyhydric alcohol which contains two or three hydroxy groups and an aliphatic acid of at least 12 carbon atoms and one or more epoxy and/or hydroxy groups per molecule.

DETAILED DESCRIPTION OF INVENTION

A. Prepolymer

Suitable prepolymer compositions used in the present invention are prepared by reacting an active-hydrogen containing polymeric material within particular molecular weight and acid number ranges with a controlled amount of a diisocyanate, with the diisocyanate being present in greater than stoichiometric amounts. Examples of active-hydrogen containing polymeric materials which may be used are polyesters, castor oil, polyester amides and polyalkylene ether glycols. Prepolymer compositions prepared by reacting a diisocyanate with active-hydrogen containing materials are more fully disclosed in U.S. Pat. Nos. 2,625,531; 2,625,532; 2,625,535; 2,692,873 and 2,702,797.

The organic diisocyanates used in the preparation of the prepolymer compositions are those which are known in the art to be useful in the preparation of such compositions by reaction with active-hydrogen containing materials. Arylene diisocyanates as represented by the diisocyanates of the benzene and naphthalene series or mixtures of these compounds are preferred. Illustrative of arylene diisocyanates that may be employed are the following: tolylene diisocyanate (2,4/2,6), toluene 2,4 diisocyanate, toluene 2,6 diisocyanate, m-phenylene diisocyanate, xenylene 4,4'-diisocyanate, naphthalene 1,5'-diisocyanate, 3,3'-bitolylene 4,4'-diisocyanate, diphenylene methane 4,4'-diisocyanate, 4-chlorophenylene 2,4-diisocyanate, dianisidine diisocyanate, diphenylene ether 4,4'-diisocyanate, and polymeric isocyanates such as polymethylene polyphenylene isocyanate. Other arylene diisocyanates which are useful include lower alkyl substituted derivatives, halogen substituted derivatives and also alkoxy substituted derivatives. Other aromatic hydrocarbon diisocyanates as well as aliphatic isocyanates may be used.

Suitable active-hydrogen containing polymeric materials used in preparing the prepolymer include castor oil, a glycol or a polyglycol monoester of a hydroxy carboxylic acid of at least 12 carbon atoms, polyalkylene ether glycols, and mixtures of any of the foregoing.

The glycol and polyglycol monoesters of hydroxy carboxylic acids of at least 12 carbon atoms are prepared by reacting a hydroxy carboxylic acid of at least 12 carbon atoms with dihydric lower aliphatic alcohols or ether alcohols, such as ethylene glycol, propylene glycol, hexylene glycol, diethylene glycol, dipropylene glycol, hexamethylene glycol, and polyethylene and polypropylene glycols, according to procedures well-known in the prior art such as direct esterification. These hydroxy monocarboxylic acids may be saturated or unsaturated. Illustrative of this class of hydroxy acids are the following: ricinoleic acid, 12-hydroxy stearic acid, hydroxy palmitic acid, hydroxy pentadecanoic acid, hydroxy myristic acid, hydroxy cerotic acid, etc.

The preferred esters used in the preparation of these prepolymers are propylene glycol monoricinoleate, ethylene glycol monoricinoleate, and propylene glycol 12-hydroxy stearate. Also other esters are useful in the preparation of the prepolymers including diethylene glycol monoricinoleate, polyethylene glycol monoricinoleate, dipropylene glycol monoricinoleate, polypropylene glycol 12-hydroxy stearate, propylene glycol hydroxy palmitate, etc.

The esters of the hydroxy carboxylic acids of at least 12 carbon atoms may be used in a weight proportion with castor oil of about 80 to 40% of the ester to about 20 to 60% castor oil, the preferred proportion being about 61 to 63% of the ester to about 39 to 37% castor oil.

It has also been found that about 2 to 9 NCO equivalents of the organic diisocyanate per equivalent of hydroxy group in the mixture of castor oil and the ester provide a useful range of prepolymer compositions.

The castor oil that may be used to prepare the prepolymers can be represented by any commercial grade of castor oil. The preferred grade of castor oil is a low acid, low volatile grade available commercially as a "DB" castor oil obtained from NL Industries, Inc.

The polyalkylene ether polyols used to prepare the prepolymer are polyoxypropylene derivatives of propylene glycol, trimethylolpropane, glycerine, or pentaerythritol. The preferred polyoxypropylene polyols used in the preparation of the prepolymers are the 200 to 800 molecular weight derivatives of propylene glycol and the 700 to 3000 molecular weight derivatives of trimethylolpropane. The preparation of these polyalkylene ether glycols and their reaction with organic diisocyanates, to produce prepolymer compositions, can be carried out according to U.S. Pat. Nos. 2,702,797 and 2,692,873.

The preferred prepolymers, for example, can be prepared by combining DB castor oil, polyoxypropylene glycol and an arylene diisocyanate. The mixture should be heated for four hours at 70° C. However, other temperatures from about 20° C. to 100° C. may be satisfactorily employed.

The polyesters reacted with the organic diisocyanate can be prepared by the reaction of two bifunctional reactants, one being a dibasic carboxylic acid and the other a glycol. The polyester amides can be prepared by the reaction of a dibasic carboxylic acid with diamines or amino alcohols. The polyesters preferably have a hydroxy number from about 40 to about 100 and an acid number from 0 to 7.

Illustrative of the dibasic carboxylic acids, preferably those whose carboxyl groups are attached to terminal carbons that may be used in the preparation of the polyesters and polyester amides, include succinic, glutaric, adipic, pimelic, maleic, malonic, fumaric, terephthalic, citric, etc. Among the glycols which may be used in the formation of the polyesters are ethylene glycol, propylene glycol, 1,3-tolylene glycol, triethylene glycol, butylene glycol, hexamethylene glycol, decamethylene glycol, and glycerine monoethers. Among the diamines which are useful in the formation of the polyester amides are those which contain at least one primary amino group, including as representative examples, ethylene diamine, propylene diamine, tetramethylene diamine, m-phenylene diamine and 3,3'-diaminodipropyl ether. Primary amino alcohols useful in the formation of polyamides include 3-aminopropanol, 6-aminohexanol, 4-aminobutanol, etc.

B. Cross-Linking Agent

According to this invention, it has been found that esters of polyhydric alcohols containing two or three hydroxy groups and an aliphatic acid of at least 12 carbon atoms and one or more hydroxy and/or epoxy groups per molecule, are useful in curing prepolymer compositions, wherein the resulting product has physical and electrical properties superior to the prepolymer compositions cured with conventional curing agents. The hydroxy and/or epoxy aliphatic acids of at least 12 carbon atoms that form an ester, when reacted with polyhydric alcohols of two or three hydroxy groups, may be saturated or unsaturated. Illustrative of this class of hydroxy acids are the following: ricinoleic acid, 12-hydroxy stearic acid, hydroxy palmitic acid, hydroxy pentadecanoic acid, hydroxy myristic acid, and hydroxy cerotic acid, as well as epoxy derivatives of these acids. The length of the carbon chain of the hydroxy and/or epoxy aliphatic acids is only limited to the extent that commercially there are available aliphatic acids having about 22 carbon atoms. However, hydroxy aliphatic acids having more than 22 carbon atoms are also contemplated.

Among the polyhydric alcohols, containing two or three hydroxy groups, that may be reacted with hydroxy and/or epoxy aliphatic acids to form an ester, are the following: ethylene glycol, propylene glycol, glycerol, diethylene glycol, dipropylene glycol, trimethylolpropane (TMP), trimethylolethane (TME) and the like.

The esters which are useful as curing agents for the prepolymers are prepared according to known procedures such as direct esterification resulting from reaction of a hydroxy and/or epoxy aliphatic acid with a polyhydric alcohol containing two or three hydroxy groups. Other well-known processes for producing esters can also be employed. The preferred curing agents for the prepolymers are ethylene glycol monoricinoleate, trimethylolpropane monoricinoleate and trimethylolethane monoricinoleate as well as the di and tri esters, and mixtures of these esters. Other esters which can be used include propylene glycol monoricinoleate, dipropylene glycol monoricinoleate, glycerol monoricinoleate and the like, as well as any other esters which would result from the reaction of the above enumerated polyhydric alcohols and aliphatic acids.

It was also discovered that oxidatively polymerized castor oil, i.e., "blown" castor oil, can be used as part of the curative mixture for purposes of improving flexibility even greater than otherwise obtained without the polymerized or "blown" castor oil.

The cured polyurethane products of this invention are particularly useful for potting and encapsulating electronic components such as, for example, for potting underseas sonar equipment. The products are also useful in coating systems and, particularly, for potting hollow fibers of fluid separatory devices employed for ultra-filtration, reverse osmosis and hemodialysis, etc. For instance, hollow fiber separatory devices are employed for dialysis, ultra-filtration, reverse osmosis, hemodialysis, hemoultrafiltration, blood oxygenation. In general, the separatory device consists of a plurality of fine hollow fibers whose end portions are potted in a tube-sheet and whose open fiber ends terminate in a tube-sheet face which provides liquid access to the interior of the fibers. The separatory elements are sealed within a casing to form a separatory cell having one or more liquid ports which allow for the passage of one fluid through the fibers and another around the fibers without mixing of the two fluids. The separatory element may have two tube-sheets or a single tube-sheet, in which latter case the fibers are doubled back so that all the ends terminate together. The general configuration of the separatory element and separatory cell is similar to a tube-and-shell heat exchanger. Patents representative of the art of hollow fiber separatory devices include U.S. Pat. Nos. 2,972,349; 3,228,876; 3,228,877; 3,422,008; 3,423,491; 3,339,341; 3,503,515 and the like.

The tube-sheet material should fill the space between the hollow fibers and yet not deform them. Moreover, the cut edge of the hollow fibers must remain substantially circular after cutting. Further, it must be easy to handle and must fabricate into a strong unit. And, of course, it must be nontoxic when used in biomedical applications. The cured polyurethane product of the present invention is especially useful as a tube-sheet material.

Many of the separatory devices described above must be flushed with ethanol prior to use. As a result, the tube-sheet material must have good alcohol resistance but must not be so hard or stiff as to be difficult to cut. It has been unexpectedly found that the esters of polyhydric alcohols containing two or three hydroxy groups and an aliphatic acid of at least 12 carbon atoms and one or more hydroxy and/or epoxy groups per molecule when used to cure the prepolymers of the instant invention have a unique combination of superior flexibility and excellent ethanol resistance.

The principle and practice of the invention will now be illustrated by the following Examples which are only exemplary thereof and it is not intended that the invention be limited thereto since modifications in technique and operation will be apparent to anyone skilled in the art. All parts and percentages expressed in the following Examples are by weight unless otherwise indicated.

The polymers and shaped structures thereof prepared in the following Examples were evaluated in accordance with the following procedures:

HARDNESS

The Shore D durometer readings were determined in accordance with ASTM D 2240. The evaluated samples were cured for 16–20 hours at room temperature, plus 2 hours at 75° C., plus 5–7 days at room temperature.

ALCOHOL RESISTANCE

The ethanol resistance of the cured polymer samples was determined in accordance with ASTM D 543. The evaluated samples were cured 16–20 hours at room temperature, plus 8 hours at 75° C. and cooled to room temperature.

PREPOLYMER PREPARATION

A. A mixture of 204 grams of a 400 molecular weight polyoxypropylene glycol, 205 grams of castor oil, and 795 grams of 4,4′diphenylene methane diisocyanate (MDI) were charged to the reactor under a nitrogen blanket and with agitation. The temperature was slowly raised to 75° C. and maintained at 70°–80° C. for 7 hours, cooling when necessary. The resulting prepolymer had an NCO content of about 16.2% and a viscosity of about 6000 cps.

B. Following the procedure of paragraph A above, a prepolymer was prepared based upon:
1560 molecular weight polyoxypropylene triol derived from trimethylolpropane 519 grams
Polyoxypropylene glycol (400 molecular weight) 343 grams 4,4′diphenylene methane diisocyanate 1331 grams This prepolymer had an NCO content of about 15% and a viscosity of about 32,000 cps.

The prepolymer compositions are cured by adding a curing agent comprising an ester of a polyhydric alcohol having 2 or 3 hydroxyl groups and an aliphatic acid of at least 12 carbon atoms and one or more hydroxy and/or epoxy groups or blends of such esters to obtain an elastomeric product. The curing process may be carried out at room temperature or at elevated temperature.

The following is an outline of the procedure that can be used to prepare room temperature cure and heat cured urethane elastomers:

PROCEDURE FOR ROOM TEMPERATURE CURE

The curing agent and prepolymer are mixed in the correct proportions until completely homogeneous. The mixture is then degassed from 3 to 5 minutes at 5 mm mercury pressure. The degassed mixture is then poured into molds and allowed to cure at room temperature.

PROCEDURE FOR HEAT CURE

The prepolymer and curing agent are separately degassed for about 30 minutes at 5 mm mercury pressure or at least until all the foam, which initially appears, collapses. The prepolymer and curing agent may be heated to facilitate degassing. The prepolymer and curing agent are then thoroughly mixed, in the proper portion, and then re-evacuated at 60° C. for about 5 minutes at 5 mm mercury pressure to remove air introduced during mixing. The degassed mixture is then poured into molds and cured for 4 hours at 100° C.

In examples 1–16 below, the heat curing procedure was used to illustrate the cured urethane elastomers of the present invention. The amounts of the agents in Examples 1–16 are expressed in parts by weight.

EXAMPLE 1

| | |
|---|---|
| Prepolymer A | 272 |
| Trimethylolpropane monoricinoleate | 220 |
| NCO/OH ratio | 1.1 |

EXAMPLE 2

| | |
|---|---|
| Prepolymer A | 272 |
| Trimethylolpropane triricinoleate | 391 |
| NCO/OH ratio | 1.1 |

EXAMPLE 3

| | |
|---|---|
| Prepolymer A | 272 |
| Trimethylolpropane monoricinoleate | 154 |
| Trimethylolpropane triricinoleate | 117 |
| NCO/OH ratio | 1.1 |

EXAMPLE 4

| | |
|---|---|
| Prepolymer A | 272 |
| Trimethylolpropane monoricinoleate | 132 |
| Trimethylolpropane triricinoleate | 156 |
| NCO/OH ratio | 1.1 |

EXAMPLE 5

| | |
|---|---|
| Prepolymer A | 272 |
| Trimethylolethane monoricinoleate | 221 |
| NCO/OH ratio | 1.1 |

EXAMPLE 6

| | |
|---|---|
| Prepolymer A | 272 |
| Propylene glycol monoricinoleate | 193 |
| NCO/OH ratio | 1.1 |

EXAMPLE 7

| | |
|---|---|
| Prepolymer A | 272 |
| Ethylene glycol monoricinoleate | 215 |
| NCO/OH ratio | 1.1 |

EXAMPLE 8

| | |
|---|---|
| Prepolymer A | 272 |
| Glycerol monoricinoleate | 162 |

-continued

| | |
|---|---|
| NCO/OH ratio | 1.1 |

EXAMPLE 9 (Control Example)

| | |
|---|---|
| Prepolymer A | 272 |
| Castor Oil | 342 |
| NCO/OH ratio | 1.1 |

EXAMPLE 10 (Control Example)

| | |
|---|---|
| Prepolymer A | 272 |
| Pentaerythritol monoricinoleate | 169 |
| NCO/OH ratio | 1.1 |

EXAMPLE 11

| | |
|---|---|
| Prepolymer B | 302 |
| Propylene glycol monoricinoleate | 193 |
| NCO/OH ratio | 1.1 |

EXAMPLE 12

| | |
|---|---|
| Prepolymer B | 302 |
| Ethylene glycol monoricinoleate | 215 |
| NCO/OH ratio | 1.1 |

EXAMPLE 13 (Control Example)

| | |
|---|---|
| Prepolymer B | 302 |
| Pentaerythritol monoricinoleate | 169 |
| NCO/OH ratio | 1.1 |

EXAMPLE 14 (Control Example)

| | |
|---|---|
| Prepolymer B | 302 |
| Castor oil | 342 |
| NCO/OH ratio | 1.1 |

EXAMPLE 15

| | |
|---|---|
| Prepolymer A | 272 |
| Ethylene glycol monoricinoleate | 151 |
| Blown castor oil | 105 |
| NCO/OH ratio | 1.1 |

EXAMPLE 16

| | |
|---|---|
| Prepolymer A | 272 |
| Ethylene glycol monoricinoleate | 173 |
| Blown castor oil | 70 |
| NCO/OH ratio | 1.1 |

Examples 1–16 were cured at room temperature for 16–20 hours plus 8 hours at 75° C., cooled to room temperature and then microtomed. The microtomed sections were microscopically examined for contact of the potting compound to the hollow fibers and for retention of the fiber geometry. In all cases the contact to the hollow fibers was judged to be excellent and the fiber ends maintained their geometry. The hardness and alcohol resistance properties of the polymers of the above Examples are listed in the Table below.

As can be seen from the Table, although the polymers of Control Examples 10 and 13 exhibit good alcohol resistance, these polymers are too hard or inflexible. Also, the polymers of Control Examples 9 and 14 exhibit good flexibility, but these polymers have poor alcohol resistance. The Examples of the invention exhibit the unique and unexpected combination of good flexibility and excellent alcohol resistance.

| Examples | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Hardness Shore D | | | | | | | | | | | | | | | | |
| Initial | 72 | 29 | 62 | 55 | 70 | 72 | 67 | 74 | 46 | 72 | 72 | 64 | 75 | 31 | 53 | 62 |
| 10 Sec. | 66 | 14 | 48 | 37 | 62 | 64 | 60 | 65 | 18 | 70 | 58 | 50 | 73 | 16 | 25 | 45 |
| Ethanol Resistance | | | | | | | | | | | | | | | | |
| % Volumetric Swell | 9.5 | 13.8 | 10.5 | 10.8 | 10.9 | 14.6 | 11.2 | 15.1 | 30.2 | 6.6 | 14.6 | 11.2 | 10.3 | 28.4 | 15.0 | 10.5 |

What is claimed is:

1. A hollow fiber separatory device comprising a hollow fiber bundle consisting of a plurality of fine hollow fibers whose end portions are potted in a tube-sheet and whose open fiber ends terminate in a tube-sheet face, the resulting bundle being sealed within a casing to form a separatory cell having one or more fluid ports which allow for the passage of one fluid through the fibers and another around the fibers without mixing of the two fluids, said tube-sheet comprising a cured polyurethane composition consisting essentially of:
   A. A prepolymer which comprises the reaction product of castor oil and polyoxypropylene glycol with at least one mole per polyol hydroxy group of an organic diisocyanate, and
   B. A cross-linking agent consisting essentially of the ester of
      i. a polyhydric alcohol containing two or three hydroxy groups, and
      ii. an aliphatic acid of at least 12 carbon atoms and one or more hydroxy and/or epoxy groups per molecule and
      blends of said ester and blown castor oil.

2. The device of claim 1 wherein the organic diisocyanate of the prepolymer is diphenylene methane 4,4'-diisocyanate.

3. The device of claim 1 wherein the polyurethane composition consists essentially of:
   A. A prepolymer which comprises the reaction product of castor oil and polyoxypropylene glycol with at least one mole per polyol hydroxy group of toluene 2,4-diisocyanate, toluene 2,6-diisocyanate or their mixtures, diphenylene methane 4,4'-diisocyanate, or m-phenylene diisocyanate, and B. a cross-linking agent comprising the monoester and/or diester of ethylene glycol and ricinoleic acid or a mono, di or tri ester of ricinoleic acid and trimethylolpropane or trimethylolethane or mixtures of the mono, di or tri esters.

4. A hollow fiber separatory device comprising a hollow fiber bundle consisting of a plurality of fine hollow fibers whose end portions are potted in a tube-sheet and whose open fiber ends terminate in a tube-sheet face, the resulting bundle being sealed within a casing to form a separatory cell having one or more fluid ports which allow for the passage of one fluid through the fibers and another around the fibers without mixing of the two fluids, said tube-sheet consisting essentially of a cured polyurethane composition comprising the reaction product of: (1) the product of the reaction of (a) a polyester prepared from bifunctional ingredients including at least one dibasic carboxylic acid and at least one bifunctional reactant in which the functional groups are hydroxy groups, said polyester having a hydroxyl number from 40–100 and an acid number from 0–7, and (b) an arylene diisocyanate, and (2) a curing agent consisting essentially of an ester of a polyhydric alcohol of two or three hydroxy groups and a hydroxy and/or epoxy aliphatic acid of at least 12 carbon atoms.

5. The cured polyurethane of claim 4 wherein the curing agent is ethylene glycol monoricinoleate, trimethlolpropane or trimethylolethane esters of ricinoleic acid or mixtures thereof.

6. A hollow fiber separatory device comprising a hollow fiber bundle consisting of a plurality of fine hollow fibers whose end portions are potted in a tube-sheet and whose open fiber ends terminate in a tube-sheet face, the resulting bundle being sealed within a casing to form a separatory cell having one or more fluid ports which allow for the passage of one fluid through the fibers and another around the fibers without mixing of the two fluids, said tube-sheet consisting essentially of a cured polyurethane composition consisting essentially of the reaction product of (1) the product of the reaction of a polyalkylene ether glycol having a molecular weight of at least about 200, a polyalkylene ether triol having a molecular weight of at least 1500 and an arylene diisocyanate wherein the arylene diisocyanate is used in an amount ranging from about 2 equivalents to 12 equivalents per equivalent of polyalkylene ether glycol and (2) a curing agent consisting essentially of an ester of a polyhydric alcohol containing two or three hydroxy groups and a hydroxy and/or epoxy aliphatic acid of at least 12 carbon atoms.

7. The cured polyurethane composition of claim 6 wherein the polyalkylene ether glycol is polyoxypropylene glycol.

8. The cured polyurethane of claim 6 wherein the curing agent is ethylene glycol monoricinoleate, trimethylolpropane or trimethylolethane esters of ricinoleic acid or mixtures thereof.

9. A hollow fiber separatory device comprising a hollow fiber bundle consisting of a plurality of fine hollow fibers whose end portions are potted in a tube-sheet and whose open fiber ends terminate in a tube-sheet face, the resulting bundle being sealed within a casing to form a separatory cell having one or more fluid ports which allow for the passage of one fluid through the fibers and another around the fibers without mixing of the two fluids, said tube-sheet comprising a cured polyurethane composition consisting essentially of the reaction product of (1) the product of the reaction of castor oil, an alkyl glycol ester of a hydroxy carboxylic acid of at least 12 carbon atoms and an arylene diisocyanate which comprises reacting from about 2 to about 3 NCO equivalents of the diisocyanate per equivalent of hydroxy group in the mixture of castor oil and ester, wherein the ester and castor oil are used in a weight proportion of about 80% to 40% of the ester to about 20% to 60% castor oil, said reaction of castor oil, ester and diisocyanate being carried out at a temperature from about 20° C. to 100° C., and (2) a curing agent consisting essentially of an ester of a polyhydric alcohol containing two or three hydroxy groups and a hydroxy and/or epoxy aliphatic acid of at least 12 carbon atoms.

* * * * *